US008707406B2

(12) United States Patent
Tosey

(10) Patent No.: US 8,707,406 B2
(45) Date of Patent: Apr. 22, 2014

(54) ALWAYS-ON VIRTUAL PRIVATE NETWORK ACCESS

(75) Inventor: Joseph Peter Robert Tosey, North Vancouver (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 1898 days.

(21) Appl. No.: 10/206,681

(22) Filed: Jul. 26, 2002

(65) Prior Publication Data

US 2004/0068666 A1 Apr. 8, 2004

(51) Int. Cl.
*H04L 9/00* (2006.01)
(52) U.S. Cl.
USPC .................................................. 726/7; 726/15
(58) Field of Classification Search
USPC ......................................................... 726/7, 15
See application file for complete search history.

(56) References Cited

U.S. PATENT DOCUMENTS

| 4,381,552 | A | * | 4/1983 | Nocilini et al. | 713/321 |
|---|---|---|---|---|---|
| 4,907,150 | A | * | 3/1990 | Arroyo et al. | 713/323 |
| 5,083,266 | A | * | 1/1992 | Watanabe | 713/601 |
| 5,095,308 | A | * | 3/1992 | Hewitt | 340/7.38 |
| 5,175,845 | A | * | 12/1992 | Little | 713/323 |
| 5,224,152 | A | * | 6/1993 | Harte | 455/574 |
| 5,265,270 | A | * | 11/1993 | Stengel et al. | 455/343.2 |
| 5,367,697 | A | * | 11/1994 | Barlow et al. | 713/330 |
| 5,446,904 | A | * | 8/1995 | Belt et al. | 713/323 |
| 5,566,366 | A | * | 10/1996 | Russo et al. | 455/343.5 |
| 5,689,715 | A | * | 11/1997 | Crump et al. | 713/310 |
| 5,790,946 | A | * | 8/1998 | Rotzoll | 455/343.1 |
| 5,987,338 | A | * | 11/1999 | Gibbons et al. | 455/574 |
| 6,018,232 | A | * | 1/2000 | Nelson et al. | 320/127 |
| 6,072,468 | A | * | 6/2000 | Hocker et al. | 345/157 |
| 6,085,114 | A | * | 7/2000 | Gibbons et al. | 455/574 |
| 6,236,674 | B1 | * | 5/2001 | Morelli et al. | 375/219 |
| 6,236,850 | B1 | * | 5/2001 | Desai | 455/343.2 |
| 6,546,425 | B1 | * | 4/2003 | Hanson et al. | 709/227 |
| 6,571,091 | B1 | * | 5/2003 | Janssen et al. | 455/343.1 |
| 6,631,469 | B1 | * | 10/2003 | Silvester | 713/2 |
| 6,766,168 | B1 | * | 7/2004 | Lim | 455/435.1 |
| 6,870,824 | B1 | * | 3/2005 | Kim et al. | 370/342 |
| 6,901,429 | B2 | * | 5/2005 | Dowling | 709/203 |
| 6,915,345 | B1 | * | 7/2005 | Tummala et al. | 709/225 |
| 6,930,598 | B2 | * | 8/2005 | Weiss | 340/531 |
| 6,954,790 | B2 | * | 10/2005 | Forslow | 709/227 |

(Continued)

FOREIGN PATENT DOCUMENTS

WO      WO 99/35557      7/1999

OTHER PUBLICATIONS

Wireless Lan Security—802.11b and Corporate Networks. ISS Technical Whitepaper. 2001. http://documents.iss.net/whitepapers/wireless_LAN_security.pdf.*

(Continued)

*Primary Examiner* — Tamara T Kyle
(74) *Attorney, Agent, or Firm* — Nixon Peabody LLP

(57) ABSTRACT

An application processor is electrically and logically decoupled from a wireless data network module so that it may go to sleep independently. A security association may be established between the wireless data network module and a wireless data network. Then the application processor may be placed in a suspend state while maintaining the security association between the wireless data network module and the wireless data network. This allows email polling, for example, to occur without having to re-establish the security association by logging in again.

32 Claims, 4 Drawing Sheets

(56) References Cited

U.S. PATENT DOCUMENTS

| | | | |
|---|---|---|---|
| 6,976,177 B2* | 12/2005 | Ahonen | 726/3 |
| 7,376,769 B1* | 5/2008 | Tubbs et al. | 710/62 |
| 7,474,650 B2* | 1/2009 | O'Neill | 370/349 |
| 2001/0004594 A1 | 6/2001 | Kuroiwa | |
| 2001/0009025 A1* | 7/2001 | Ahonen | 713/161 |
| 2002/0006788 A1* | 1/2002 | Knutsson et al. | 455/422 |
| 2002/0068618 A1 | 6/2002 | Shoobridge | |
| 2002/0099854 A1* | 7/2002 | Jorgensen | 709/249 |
| 2002/0112076 A1* | 8/2002 | Rueda et al. | 709/245 |
| 2002/0124090 A1* | 9/2002 | Poier et al. | 709/228 |
| 2002/0184438 A1* | 12/2002 | Usui | 711/106 |
| 2003/0009540 A1* | 1/2003 | Benfield et al. | 709/220 |
| 2003/0041125 A1* | 2/2003 | Salomon | 709/220 |
| 2003/0041136 A1* | 2/2003 | Cheline et al. | 709/223 |
| 2003/0041167 A1* | 2/2003 | French et al. | 709/238 |
| 2003/0081579 A1* | 5/2003 | Tosey et al. | 370/338 |
| 2003/0084342 A1* | 5/2003 | Girard | 713/201 |
| 2003/0182431 A1* | 9/2003 | Sturniolo et al. | 709/227 |
| 2003/0191937 A1* | 10/2003 | Balissat et al. | 713/163 |
| 2004/0203942 A1* | 10/2004 | Dehlin | 455/466 |
| 2005/0091338 A1* | 4/2005 | de la Huerga | 709/217 |
| 2005/0273603 A1* | 12/2005 | Girard | 713/164 |
| 2006/0153085 A1* | 7/2006 | Willins et al. | 370/242 |

OTHER PUBLICATIONS

A Comprehensive Review of 802.11 Wireless LAN Security and the Cisco Wireless Security Suite. Cisco Aironet 1200 Series Wireless LAN Security White Paper. 2002. http://www.cisco.com/en/US/products/hw/wireless/ps430/products_white_paper09186a00800b469f.shtml.*

International Search Report, PCT/CA03/01119, dated Dec. 23, 2003.

* cited by examiner

ALWAYS-ON VIRTUAL PRIVATE NETWORK ACCESS

FIELD OF THE INVENTION

The present invention relates to the field of virtual private networks. More particularly, the present invention relates to always-on virtual private network access.

BACKGROUND OF THE INVENTION

Mobile devices, such as cellular phones and personal digital assistants (PDAs) have been growing in popularity for many years. As they have grown in complexity, the number of functions they are capable of running has also increased. Now email access is a standard feature on many wireless devices. However, a problem arises in accessing unexpected email in a timely fashion.

The current standard practice is to send a short message service (SMS) page to the device to wake it up. The email is normally compressed and stored within the SMS page. However, SMS messages are short, so it is difficult to encapsulate an entire email in one message. SMS also does not support standard security protocols such as SSL or IPSec. Additionally, SMS is very expensive compared with high-bandwidth protocols. Lastly, this technique does not generalize to 802.11b, Bluetooth, or other non-cellular protocols.

Alternatively, the cellular device may poll for email. In a first case, devices may wake up periodically, dial into a network, establish a virtual private network (VPN) connection and poll for email. This, however, requires an authentication for connection. In the case of cellular data, this can be expensive as almost all the transferred data is for authentication, and not user data. In a second case, the device may simply be left on and connected to the VPN connection at all times, periodically polling for email, much like a wired device such as a computer device does with, for example, a digital subscriber line (DSL) connection. This, however, is not practical in a wireless device as it uses up the power in the battery too quickly.

What is needed is a solution wherein a wireless device may access unanticipated email in a timely fashion without the drawbacks of the prior art solutions.

BRIEF DESCRIPTION OF THE INVENTION

An application processor is electrically and logically decoupled from a wireless data network module so that it may go to sleep independently. A security association may be established between the wireless data network module and a wireless data network. Then the application processor may be placed in a suspend state while maintaining the security association between the wireless data network module and the wireless data network. This allows email polling, for example, to occur without having to re-establish the security association by logging in again.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
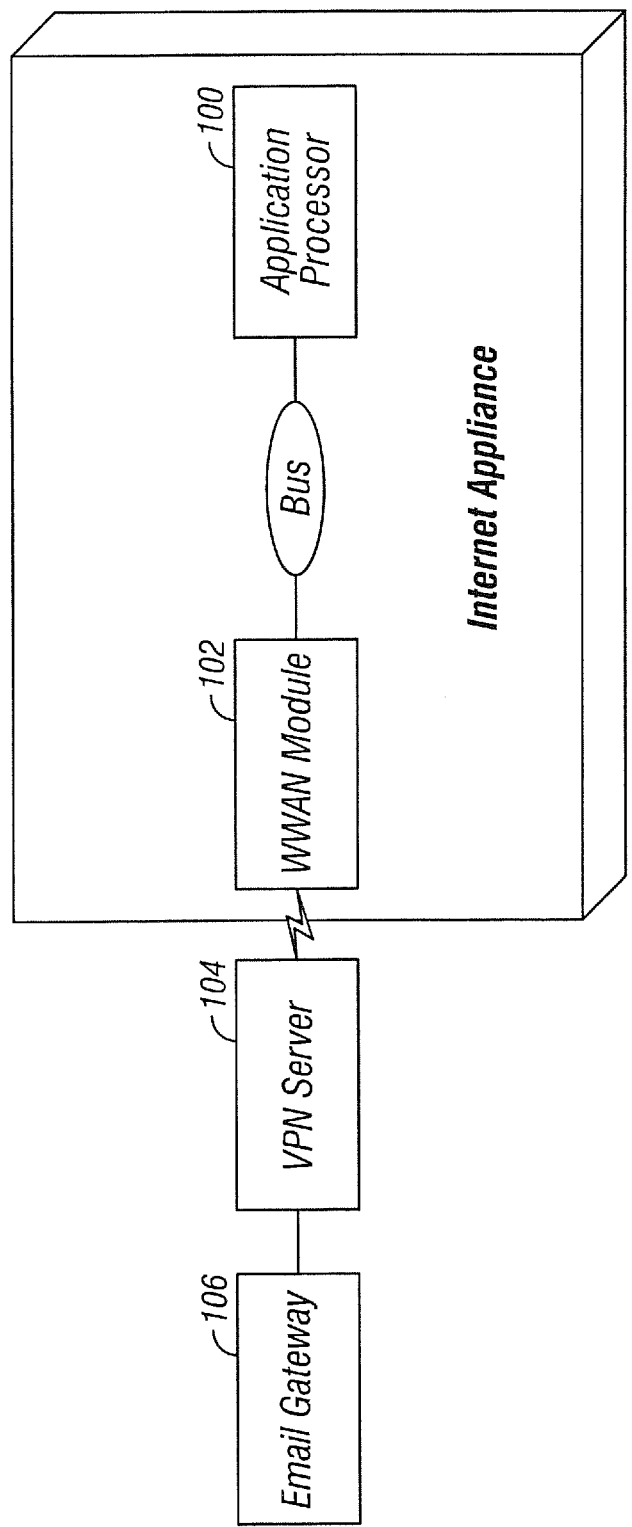
FIG. 1 is a block diagram illustrating a virtual private network (VPN) wireless device in accordance with a specific embodiment of the present invention.

FIG. 1 is a block diagram illustrating a virtual private network (VPN) wireless device in accordance with a specific embodiment of the present invention. This architecture of a wireless internet appliance is used to provide VPN access which is always on. In current wireless devices, the application processor 100 controls the link to the wireless wide area network (WWAN) module 102. Standard industry practice, as embodied by the Global System for Mobile Communications (GSM) and Code Division Multiple Access (CDMA) standards, is that the WWAN module 102 emulates a dial-up modem. As such, if the application processor 100 is suspended for any reason, the WWAN data session is dropped as a side effect. It is not possible for the WWAN module to maintain a session while the application processor is suspended. While it is possible for the WWAN module 102 to remain powered, and even to wake the internet appliance on an incoming page or detection of wireless service, the high-speed data session is still dropped when the internet appliance is placed in a low-power state.

In the present invention, the application processor 100 is electrically and logically decoupled from the WWAN module so that it may go to sleep independently. That is, it may send the WWAN module an indication that it is about to power down. This indication may be sent through an electrical signal, or it may be sent as an out-of-band application protocol data unit from a power management subsystem, to signal the wireless modem that it is about to power down. One of ordinary skill in the art will recognize that there may be other ways to send the WWAN module an indication that it is about to power down than just the specific examples described above.

In a specific embodiment of the present invention, the WWAN module 102 waits for its queues to drain and then acknowledges the request to suspend. The acknowledgement may also be an electrical signal or APDU [APPLICATION DATA UNIT?]. It is also possible for the WWAN module to acknowledge before it has drained its queue, or not to acknowledge at all.

Having received an acknowledgement, the application processor 100 may then enter into a deep suspend state without terminating any sessions. Of particular note, it has not terminated the secure association with the VPN server, nor the login with the email server.

Subsequent to suspension, a network event may occur such as receipt of an IP packet (such as a keep-alive), connection clear (out of range), or an incoming email notification. In this case, the WWAN module may receive the signal from a VPN server 104 and wake up the Internet appliance by using a RING signal or equivalent. When the device has acknowledged that it is awake, using, for example, an electrical signal or application protocol data unit, the WWAN module may either signal the Internet appliance of the network event, or wait for the Internet appliance to poll the wireless modem for that event. A predefined polling period may also be utilized to periodically wake the application processor to check for email from an email gateway 106.

By using this new capability, a wireless Internet appliance may associate with a network once in the beginning of the day, and quickly poll for new messages on a periodic basis.

Figure 2:
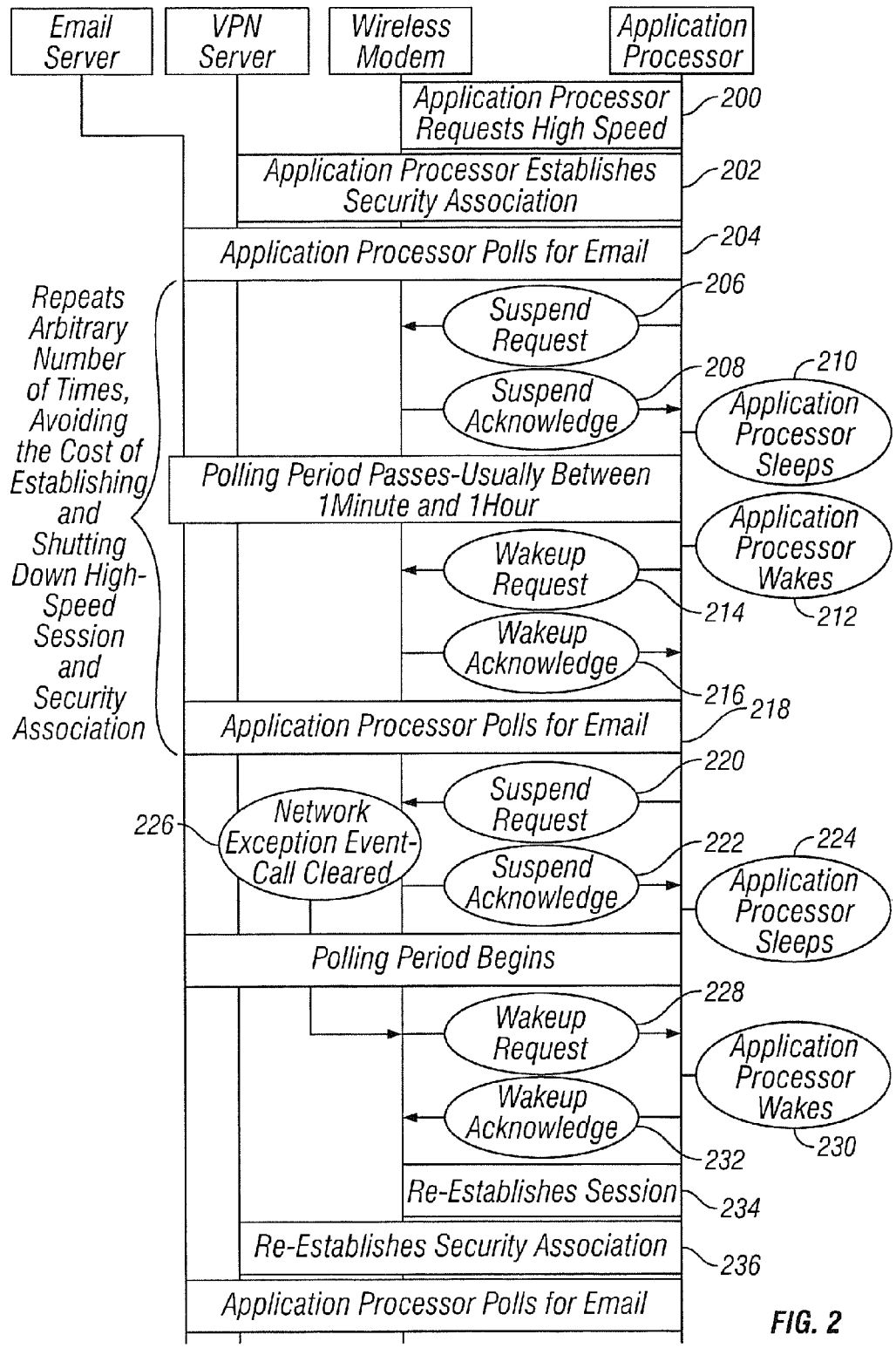
FIG. 2 is an application flow diagram illustrating message flows in accordance with a specific embodiment of the present invention.

FIG. 2 is an application flow diagram illustrating message flows in accordance with a specific embodiment of the present invention. At 200, the application processor may request high speed data network access from the WWAN module. The WWAN module then connects to the VPN server and the application processor establishes a security association at 202. Since this is the initial log-in, the application processor may then poll for email at 204. Once that is done, the application processor may wish to enter a sleep mode to conserve power. It may therefore send a suspend request to the WWAN module at 206. The WWAN module may acknowledge the suspend request at 208, and the application processor may go to sleep at 210. Note, the WWAN module is not in sleep mode and remains connected to the VPN server.

After a predefined polling period, the application processor may wake up at 212. It may send a wakeup request to the WWAN module at 214. The WWAN module may acknowledge the wakeup request at 216. The application processor may then poll for email at 218. Once that is done, the application processor may wish to enter a sleep mode again to conserve power. It may therefore send a suspend request to the WWAN module 220. The WWAN module may acknowledge the suspend request at 222, and the application processor may go to sleep at 224.

A network exception event, such as a connection cleared (out of range) may occur at 226. This may cause the WWAN to need to re-establish the security association in order to stay connected to the VPN. Thus, the WWAN may then issue a wakeup request to the application processor at 228, causing the application processor to wake at 230 and acknowledge the wakeup request at 232. It then may re-establish its session with the WWAN module at 234 and re-establish the security association with the WWAN at 236.

This may also be helpful if an important email is received during the polling period. For example an "emergency" signal could be generated to the WWAN module from the VPN when an email message marked as "urgent" is received.

Figure 3:
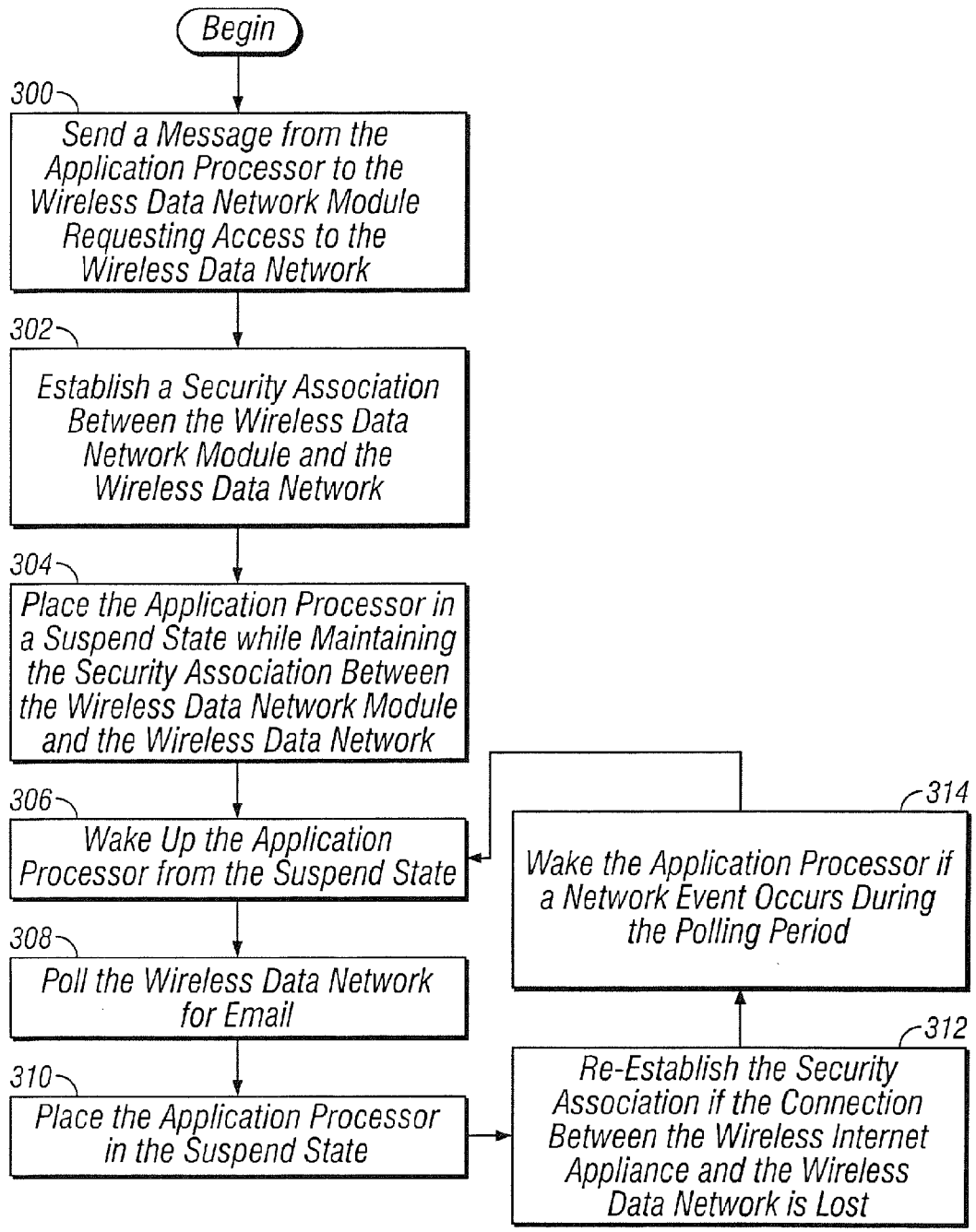
FIG. 3 is a flow diagram illustrating a method for connecting a wireless Internet appliance to a wireless data network, the wireless Internet appliance having a wireless data network module and an application processor, in accordance with a specific embodiment of the present invention.

FIG. 3 is a flow diagram illustrating a method for connecting a wireless Internet appliance to a wireless data network, the wireless Internet appliance having a wireless data network module and an application processor, in accordance with a specific embodiment of the present invention. At 300, a message is sent from the application processor to the wireless data network module requesting access to the wireless data network. The wireless data network module may be a wireless modem. At 302, a security association between the wireless data network module and the wireless data network may be established. At 304, the application processor may be placed in a suspend state while maintaining the security association between the wireless data network module and the wireless data network. While in the suspend state, a polling period may toll.

At 306, the application processor may be woken up from the suspend state. This may occur at the end of the polling period and may be accomplished by using a RING signal. At 308, the wireless data network may be polled for email. This may comprise polling an email server. At 310, the application processor may then again be placed in the suspend state. At 312, the security association may be re-established if the connection between the wireless Internet appliance and the wireless data network is lost. At 314, if a network event occurs during the polling period, such as the receipt of an IP packet, a connection clear alert, or an incoming email notification, the application processor may be awoken. Once again, this may be accomplished by using a RING signal. The application processor may then handle the network event, which may include re-establishing the security association if it has been lost.

Figure 4:
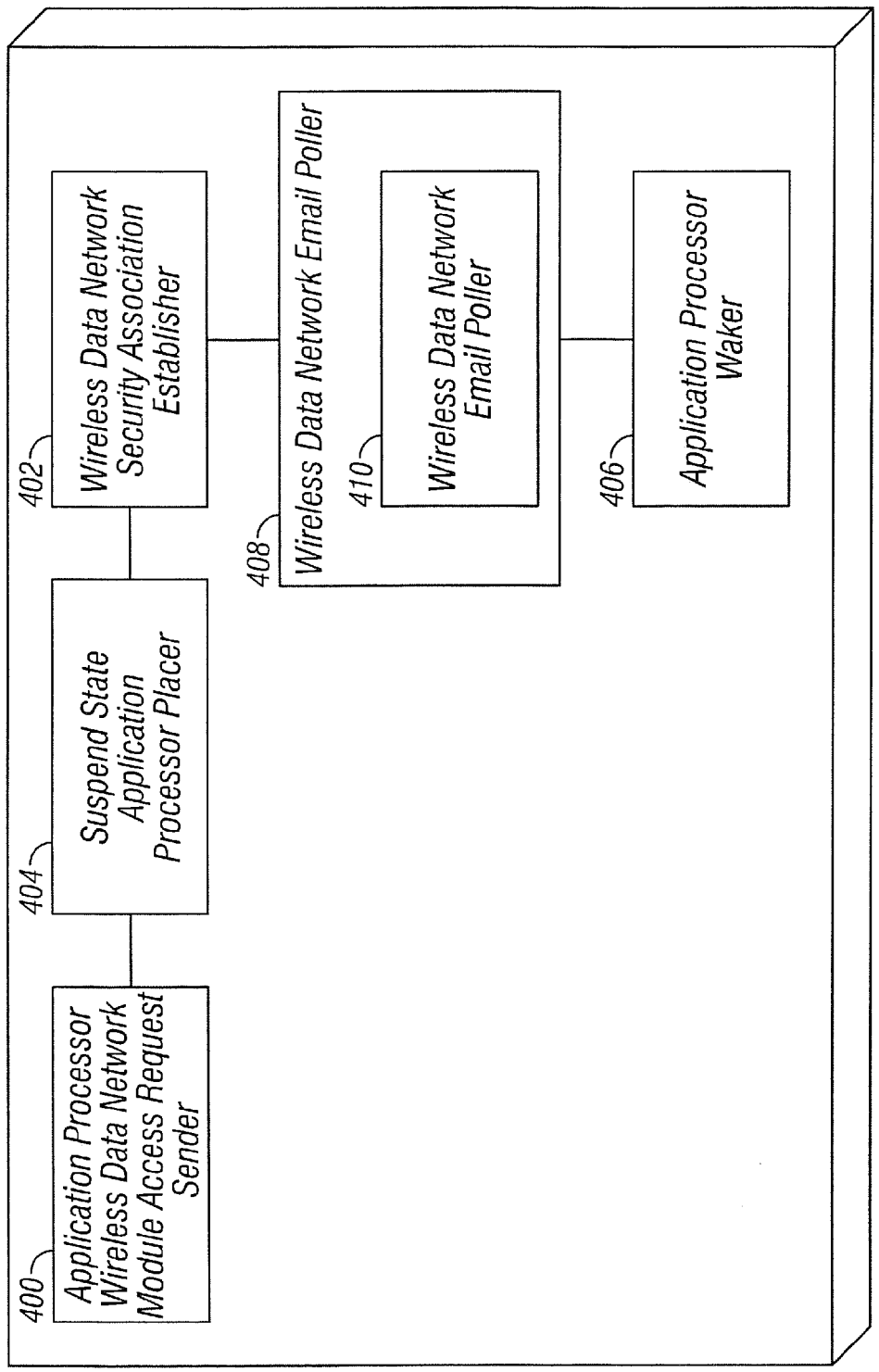
FIG. 4 is a block diagram illustrating an apparatus for connecting a wireless Internet appliance to a wireless data network, the wireless Internet appliance having a wireless data network module and an application processor, in accordance with a specific embodiment of the present invention.

FIG. 4 is a block diagram illustrating an apparatus for connecting a wireless Internet appliance to a wireless data network, the wireless Internet appliance having a wireless data network module and an application processor, in accordance with a specific embodiment of the present invention. An application processor wireless data network module access request sender 400 may send a message from the application processor to the wireless data network module requesting access to the wireless data network. The wireless data network module may be a wireless modem. A wireless data network security association establisher 402 may establish a security association between the wireless data network module and the wireless data network. A suspend state application processor placer 404 coupled to the wireless data network security association establisher 402 and to the application processor wireless data network module access request sender 400 may place the application processor in a suspend state while maintaining the security association between the wireless data network module and the wireless data network. While in the suspend state, a polling period may toll.

An application processor waker 406 may wake up the application processor from the suspend state. This may occur at the end of the polling period and may be accomplished by using a RING signal. A wireless data network email poller 408 coupled to the application processor waker 406 and to the wireless data network security association establisher 402 may poll the wireless data network for email. This may comprise polling an email server using a wireless data network email poller 410.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
   establishing a security association between a Virtual Private Network (VPN) server and an application processor of an Internet appliance;
   storing information regarding the security association in a memory corresponding to the application processor;
   sending a first message from the application processor to a wireless data network module of the Internet appliance, requesting access to a wireless data network;
   determining, by the application processor, to enter a suspend state;
   sending a second message from the application processor to the wireless data network module, the second message indicating the application processor is about to power down;
   sending an acknowledgement of the second message from the wireless data network module to the application processor; and
   responsive the acknowledgement, placing the application processor in the suspend state while maintaining the security association, wherein the suspend state retains the security association information in a memory corresponding to the application processor, the wireless data network module electrically decoupled from the application processor such that the application processor may enter the suspend state without powering down the wireless data network module while retaining the security association information in the memory.

2. The method of claim 1, further comprising:
   polling the wireless data network for email while the application processor is not in the suspend state.

3. The method of claim 2, wherein the polling comprises polling an email server.

4. The method of claim 2, further comprising:
   if the application processor is in a suspend state, waking up the application processor before the polling.

5. The method of claim 2, further comprising:
   waking up the application processor before the polling after a predefined polling period.

6. The method of claim 1, wherein the wireless data network module is a wireless modem.

7. The method of claim 1, further comprising re-establishing the security association if the connection between the wireless Internet appliance and the VPN server is lost.

8. The method of claim 1, further comprising waking the application processor if a network event occurs.

9. The method of claim 8, wherein the network event is a receipt of an IP packet.

10. The method of claim 8, wherein the network event is a connection clear alert.

11. The method of claim 8, wherein the network event is an incoming email notification.

12. The method of claim 4, wherein the waking comprises waking the application processor using a RING signal.

13. The method of claim 8, wherein the waking comprises waking the application processor using a RING signal.

14. A wireless Internet appliance comprising:
    an application processor; and
    a wireless data network module communicatively coupled to the application processor, the application processor configured to send a first message to the wireless data network module requesting access to a wireless data network, the application processor further configured to determine to enter a suspend state, the application processor further configured to send a second message to the wireless data network module, the second data message indicating the application processor is about to power down, the wireless data network module further configured to send an acknowledgement of the second message to the application processor, the application processor further configured to, responsive to the acknowledgement, place the application processor in the suspend state, wherein the wireless data network module is electrically decoupled from the application processor such that the application processor may enter the suspend state without powering down the wireless data network module while retaining security association information in a memory corresponding to the application processor.

15. The wireless Internet appliance of claim 14, wherein the wireless data network module is a wireless modem.

16. The apparatus of claim 14, further comprising:
    a wireless data network email poller configured to poll the wireless data network for email while the application processor is not in the suspend state.

17. The apparatus of claim 16, further comprising:
    an application processor waker coupled to the wireless data network email poller configured to wake up the application processor before the polling.

18. The apparatus of claim 16, comprising:
    an application processor polling period waker coupled to the wireless data network email poller and configured to wake up the application processor before the polling after a predefined period.

19. An apparatus comprising:
    means for establishing a security association between a Virtual Private Network (VPN) server and an application processor of an Internet appliance;
    means for storing information regarding the security association in memory corresponding to the application processor;
    means for sending a first message from the application processor to a wireless data network module of the Internet appliance, requesting access to a wireless data network;
    means for determining, by the application processor, to enter a suspend state;
    means for sending a second message from the application processor to the wireless data network module, the second message indicating the application processor is about to power down;
    means for sending an acknowledgement of the second message from the wireless data network module to the application processor; and means for, responsive to the acknowledgement, placing the application processor in a suspend state while maintaining the security association, wherein the suspend state retains the security association information in a memory corresponding to the application processor, the wireless data network module electrically decoupled from the application processor such that the application processor may enter the suspend state without powering down the wireless data network module while retaining the security association information in the memory.

20. The apparatus of claim 19, further comprising:
means for polling the wireless data network for email while the application processor is not in the suspend state.

21. The apparatus of claim 20, wherein the means for polling comprises means for polling an email server.

22. The apparatus of claim 20, further comprising:
means for, if the application processor is in the suspend state, waking up the application processor before the polling.

23. The apparatus of claim 20, further comprising:
means for waking up the application processor before the polling after a predefined polling period.

24. The apparatus of claim 19, wherein the wireless data network module is a wireless modem.

25. The apparatus of claim 19, further comprising means for re-establishing the security association if the connection between the wireless Internet appliance and the VPN server is lost.

26. The apparatus of claim 25, further comprising means for waking the application processor if a network event occurs.

27. The apparatus of claim 26, wherein the network event is a receipt of an IP packet.

28. The apparatus of claim 26, wherein the network event is a connection clear alert.

29. The apparatus of claim 26, wherein the network event is an incoming email notification.

30. The apparatus of claim 22, wherein the means for waking comprises means for waking the application processor using a RING signal.

31. The apparatus of claim 26, wherein the means for waking comprises means for waking the application processor using a RING signal.

32. A program storage device readable by a machine, tangibly embodying a program of instructions executable by the machine to perform a method, the wireless Internet appliance having a wireless data network module and an application processor, the method comprising:
establishing a security association between a Virtual Private Network (VPN) server and an application processor of an Internet appliance;
storing information regarding the security association in a memory corresponding to the application processor;
sending a first message from the application processor to a wireless data network module of the Internet appliance, requesting access to a wireless data network;
determining, by the application processor, to enter a suspend state;
sending a second message from the application processor to the wireless data network module, the second message indicating the application processor is about to power down;
sending an acknowledgement of the second message from the wireless data network module to the application processor; and
responsive the acknowledgement, placing the application processor in the suspend state while maintaining the security association, wherein the suspend state retains the security association information in a memory corresponding to the application processor, the wireless data network module electrically decoupled from the application processor such that the application processor may enter the suspend state without powering down the wireless data network module while retaining the security association information in the memory.

* * * * *